(12) United States Patent
Ouyang et al.

(10) Patent No.: US 9,329,452 B2
(45) Date of Patent: May 3, 2016

(54) TUNABLE OPTICAL FREQUENCY CONVERTER BASED ON AN ULTRASONIC GRATING

(71) Applicant: SHENZHEN UNIVERSITY, Shenzhen, Guangdong (CN)

(72) Inventors: Zhengbiao Ouyang, Guangdong (CN); Chunchao Qi, Guangdong (CN)

(73) Assignee: Shenzhen University, Shenzhen (CN)

( * ) Notice: Subject to any disclaimer, the term of this patent is extended or adjusted under 35 U.S.C. 154(b) by 50 days.

(21) Appl. No.: 14/360,471

(22) PCT Filed: Oct. 24, 2012

(86) PCT No.: PCT/CN2012/083446
§ 371 (c)(1),
(2) Date: May 23, 2014

(87) PCT Pub. No.: WO2013/075567
PCT Pub. Date: May 30, 2013

(65) Prior Publication Data
US 2014/0320953 A1 Oct. 30, 2014

(30) Foreign Application Priority Data
Nov. 23, 2011 (CN) .......................... 2011 1 0378755

(51) Int. Cl.
*G02F 1/35* (2006.01)
*G02F 1/11* (2006.01)
*G02F 2/02* (2006.01)

(52) U.S. Cl.
CPC *G02F 1/353* (2013.01); *G02F 1/11* (2013.01); *G02F 1/113* (2013.01); *G02F 2/02* (2013.01); *G02F 2201/17* (2013.01); *G02F 2201/307* (2013.01); *G02F 2203/055* (2013.01)

(58) Field of Classification Search
CPC ....................................................... G02F 1/353
USPC ................................ 359/326–332; 372/21–22
See application file for complete search history.

(56) References Cited

U.S. PATENT DOCUMENTS

| 6,723,991 | B1 | 4/2004 | Sucha et al. |
| 2014/0300948 | A1* | 10/2014 | Ouyang et al. ................ 359/326 |
| 2014/0313570 | A1* | 10/2014 | Ouyang et al. ................ 359/326 |
| 2014/0327956 | A1* | 11/2014 | Ouyang et al. ................ 359/326 |

FOREIGN PATENT DOCUMENTS

| CN | 1554967 | 12/2004 |
| CN | 101695200 | 4/2010 |
| CN | 102244334 | 11/2011 |
| CN | 102621764 | 8/2012 |
| JP | 2000-039635 | 2/2000 |

OTHER PUBLICATIONS

International Search Report for international application No. PCT/CN2012/083446, dated Jan. 31, 2013 (6 pages).

* cited by examiner

*Primary Examiner* — Daniel Petkovsek
(74) *Attorney, Agent, or Firm* — Hamre, Schumann, Mueller & Larson, P.C.

(57) ABSTRACT

The present invention provides a tunable optical frequency converter based on an ultrasonic grating, which includes a laser, a first optical isolator, and a circulating frequency shift module. Said circulating frequency shift module is composed of an optical coupler, an ultrasonic grating, a lens group, an optical amplifier, a second optical isolator, a first optical circulator, a fiber Bragg grating, a second optical circulator, a tunable filter and a tunable attenuator. Light outputted by said laser is inputted to said circulating frequency shift module to conduct frequency shifting repeatedly after passing through the first optical isolator, and then separated by a tunable filter and a second optical circulator, then frequency converted light is outputted from the port of the circulating frequency shift module. The frequency converter provided in the present invention has a compact volume and fewer optical components, which means it is easy to be integrated, a big frequency converting range, a high frequency converting efficiency and a high output power.

13 Claims, 1 Drawing Sheet

TUNABLE OPTICAL FREQUENCY CONVERTER BASED ON AN ULTRASONIC GRATING

FIELD OF THE INVENTION

The present invention relates to a tunable optical frequency converter based on an ultrasonic grating, particularly to frequency shift capable of broadband tuning based on an ultrasonic grating, circulating frequency shift and filtering technology.

BACKGROUND OF THE INVENTION

Optical frequency down-conversion and up-conversion are essentially the difference-frequency and the sum-frequency technologies. Compared with the traditional method by harmonic generation, the biggest advantage of the difference-frequency and sum-frequency synthesis technology systems is that the systems are portable and compact, and contains richer frequency components. Currently, this technology includes frequency spacing dichotomy, optical parametric oscillator method, nonlinear crystal optical method, laser diode four-wave mixing frequency method, optical frequency comb generator method, and so on. The frequency spacing dichotomy method and the optical frequency comb generator method are more characteristic in these methods. Both methods aim at dividing a large spacing of optical frequencies into a plurality of smaller frequency spacing in a certain relationship with a known frequency which generally can be measured by known means, thus an extremely convenient means is provided for the frequency detection technology.

From another perspective, if we can continue to move the measurable frequencies with small pitch and eventually get arbitrarily frequencies with large spacing, and these arbitrary optical frequencies can also be measured, it would be a very good idea. For example, a known frequency $\omega_{rf}$ is known in advance, now in the vicinity of the original frequency $\omega_c$, via only implementations of known frequency $\omega_{rf}$ multiplication or demultiplication several times, finally, any desired frequency $\omega_c \pm n\omega_{rf}$ can be achieved via the original frequency $\omega_c$. And at this time, the magnitude of each frequency can be shown up through a filter like a frequency "screen". If this idea can really be realized, not only the technology can meet the requirements of the optical frequency measurement, but also any desired frequency of the light source can be obtained.

To realize this idea, the present invention discloses a tunable optical frequency converter based on an amplitude modulator. The invention will greatly simplify the structure of the frequency-tunable laser, significantly reduce the cost, miniaturize the prior large optical laboratory, since one such tunable optical frequency converter can replace dozens to hundreds of lasers, thus the integrated cost of the optical experiments can be substantially reduced, expected to be widely used in scientific research, industrial production and so on.

SUMMARY OF THE INVENTION

Technical problem to be solved by the present invention is to provide a compact, portable broadband frequency tuning converter which is easy to integrate and can be broadbandly and high-effectively tuned.

The solution to solve the technical problem of the present invention is that: a tunable optical frequency converter based on an ultrasonic grating is provided; the converter includes a laser, a first optical isolator, and a circulating frequency shift module based on the ultrasonic grating frequency shift; light outputted by said laser is inputted to said circulating frequency shift module to conduct frequency shifting repeatedly after passing through the first optical isolator, and then separated by a tunable filter and a second optical circulator, then frequency converted light is outputted from the port of the circulating frequency shift module.

The laser is a semiconductor laser, a gas laser, a solid laser or a fiber laser with an operating wavelength in the 100 nm-100000 nm band.

The optimum value of the closed-loop gain coefficient of the circulating frequency shift module based on the ultrasonic grating frequency shift is 1, the second optimum value is positive integer other than 1, and the third optimum value is the reciprocal value of the positive integer other than 1.

Said circulating frequency shift module based on the ultrasonic grating frequency shift is composed of an optical coupler, an ultrasonic grating, lens $L_1$, lens $L_2$, an optical amplifier, a second optical isolator, a first optical circulator, a fiber Bragg grating, a second optical circulator, a tunable filter and a tunable attenuator.

The ultrasonic grating is a transmission ultrasonic grating and is used for phase modulation.

The output power of the ultrasonic grating and the lens $L_1$ and the lens $L_2$ can't exceed the maximum allowable input light power of the optical amplifier.

Said first light circulator is a 3-port circulator, wherein, a first port is connected to the output port of the second optical isolator, a second port is connected to the input port of the optical fiber Bragg grating, and a third port is connected to an absorbing load which absorbs the reflected light from the optical fiber Bragg grating.

Said second light circulator is a 3-port circulator, wherein, a first port thereof is connected to the output port of the optical fiber Bragg grating, a second port is connected to the input port of the tunable filter, and a third port serves as the light output port of the circulating frequency shift module.

The operating frequency bandwidth of respective members in the circulating frequency shift module based on the ultrasonic grating frequency shift is not less than the frequency difference between the maximum output frequency at the output of the circulating frequency shift module and that of the laser source.

The operating wavelength bands of said first optical isolator and respective members in the circulating frequency shift module based on the ultrasonic grating frequency shift are consistent with that of the laser.

Said tunable filter is a narrow-band filter which reflects a narrow-band light desired to be filtered to the third port of the second circulator so as to output it, and transmits the light with other frequencies to the input port of the optical attenuator, the frequency variation of said frequency converter is equal to the difference between the frequency of the narrow-band output light of the tunable filter and that of the output light of the laser, and the tunable frequency range of the frequency converter is not more than that of the narrow-band output light of the tunable filter.

The tunable filter is a frequency-tunable filter manufactured by one-dimensional defect-photonic-crystal technology or optical-diffraction-grating technology.

The photonic bandgap of the one-dimensional photonic crystal is not less than the frequency tuning range of the final output light wave of the system, said one-dimensional photonic crystal includes a refractive index adjustable defect layer, the refractive index adjusting method of which includes electro-induced refractive index change, magneto-induced refractive index change, acoustic-induced refractive index change, photo-induced refractive index change, force-induced refractive index change or thermal-induced refractive index change, the one-dimensional photonic crystal has a defect mode which changes along with the change of the refractive index of the defect layer.

The tunable optical frequency converter provided in the present invention has small size, less optical members, low cost, large tuning range, high tuning efficiency, high output power, and easy operation, and is easy to be integrated.

BRIEF DESCRIPTION OF THE DRAWINGS

Below in connection with the accompanying drawings and specific embodiments, the present invention will be described in further detail.

DETAILED DESCRIPTION OF THE PREFERRED EMBODIMENTS

Figure 1:
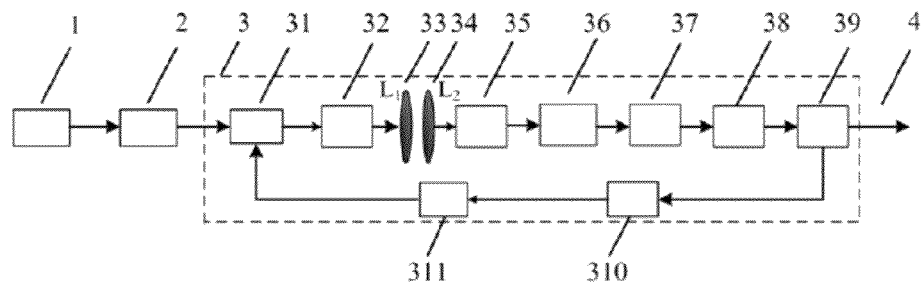
FIG. 1 is a system structure schematic diagram of the tunable optical frequency converter based on the ultrasonic grating in the present invention.

The present invention provides a tunable optical frequency converter based on the ultrasonic grating, as shown in FIG. 1, which includes a laser 1, a first optical isolator 2, and a circulating frequency shift module 3 based on the ultrasonic grating. Light outputted by said laser 1 is inputted to said circulating frequency shift module 3 to conduct frequency shifting repeatedly after passing through the first optical isolator 2, and then separated by a tunable filter 310 and a second optical circulator 39, then frequency shifted light is outputted from the port 4 of the circulating frequency shift module.

The laser 1 is a semiconductor laser, a gas laser, a solid laser or a fiber laser with an operating wavelength in the 100 nm-100000 nm band.

The optimum value of the closed-loop gain coefficient of the circulating frequency shift module 3 based on the ultrasonic grating frequency shift is 1, the second optimum value is positive integer other than 1, and the third optimum value is the reciprocal value of the positive integer other than 1.

Said circulating frequency shift module 3 based on the ultrasonic grating frequency shift is composed of an optical coupler 31, an ultrasonic grating 32, lens $L_1$ 33, lens $L_2$ 34, an optical amplifier 35, a second optical isolator 36, a first optical circulator 37, a fiber Bragg grating 38, a second optical circulator 39, a tunable filter 310 and a tunable attenuator 311.

The ultrasonic grating 32 is a transmission ultrasonic grating and is used for phase modulation. The frequency-shift principle of the ultrasonic grating 32 is that: when ultrasonic wave propagates in transparent medium, it will induce elastic strain of the medium to vary periodically in time and space, which causes the refractive index of the medium to vary correspondingly. If the acousto-optic operating distance is short, light wave passing through the medium mainly induces the periodic spatial variation. And finally, the phase of the light wave is modulated. Without loss of generality, assuming the ultrasonic wave in the acousto-optic medium is plane longitudinal wave propagating along x direction, the angular frequency thereof is $\omega_s$, the wave vector is $k_s$ ($=2\pi/\lambda_s$), wherein, $\lambda_s$ is the wavelength of the ultrasonic wave; incident light is a plane wave propagating along z direction, the angular frequency thereof is $\omega$, the wave vector is k ($=2\pi/\lambda$), wherein, $\lambda$ is the wavelength of the light wave in vacuum. When the elastic strain of the medium is small, the variable relationship that the refractive index n varies along with x and time t is:

$$n(x,t)=n_0+(\Delta n)_m \sin(\omega_s t-k_s x) \quad (1)$$

wherein, $n_0$ represents the refractive index of the medium without the ultrasonic wave, $(\Delta n)_m$ represents the amplitude of the refractive index variation. When the light wave passes through the ultrasonic grating with a thickness of L, the induced phase variation is $$\Delta\Phi(x,t)=kn(x,t)L=\Delta\Phi_0+\Delta\Phi_m \sin(\omega_s t-k_s x) \quad (2)$$

wherein, $A\Phi_0$ represents the phase difference when the light passing through the ultrasonic grating with the thickness of L without the ultrasonic wave, $\Delta\Phi_m$ represents the variation amplitude of the phase difference. Assuming before the light passes through the ultrasonic grating at the first time, the electric vector in z=−L/2 plane is $$E=Ae^{i\omega t} \quad (3)$$

then, after the light passes through the ultrasonic grating at the first time, the electric vector in z=−L/2 plane is $$E=Ae^{i[\omega t-\Delta\Phi_0-\Delta\Phi_m \sin(\omega_s t-k_s x)]} \quad (4)$$

A mathematics identical equation (5) is used:

$$e^{i\beta \sin\theta} = \sum_{n=-\infty}^{\infty} J_n(\beta)e^{in\theta}, \quad (5)$$

$$J_{-n}(\beta) = (-1)^n J_n(\beta)$$

In equation (5), $J_n(\beta)$ is the Bessel function of the first kind. Using equation (5), formula (4) can be changed to $$E=CJ_0(\beta)e^{i\omega t}$$
$$+CJ_1(\beta)e^{i(\omega-\omega_s)t}-CJ_1(\beta)e^{i(\omega+\omega_s)t}$$
$$+CJ_2(\beta)e^{i(\omega-2\omega_s)t}+CJ_2(\beta)e^{i(\omega+2\omega_s)t}$$
$$\ldots$$
$$+CJ_n(\beta)e^{i(\omega-n\omega_s)t}+CJ_2(\beta)(-1)^n e^{i(\omega+n\omega_s)t} \quad (6)$$

wherein, $C=A\exp[i(-\Delta\phi_0+k_x x)]$, $\beta=\Delta\Phi_m$. Formula (6) represents superposition of the electric vectors of the n orders diffractive plane waves. Additionally, in the deformation process above, it has been assumed that $$k_x=k \sin\alpha=nk_s \quad (7)$$

wherein, α represents the diffractive angle. If formula (7) is rewritten as $$\lambda_s \sin\alpha=n\lambda, \quad (n=0,\pm 1,\pm 2,\ldots) \quad (8)$$

it can be found from formula (8) that this formula is very similar to the expression of known grating equation, wherein $\lambda_s$ corresponds to the grating constant. The relationship among the ultrasonic grating constant (i.e. wavelength of the ultrasonic wave), wavelength of the light wave and the diffractive angles with different diffractive orders can be ascertained from this formula.

Practically, only the first order diffraction is used as the circulation object, i.e., people are just interested in the second line of the formula (6), especially, the expression of the second term. Then after the light passes through the ultrasonic grating N times, the electric vector of the high frequency component of the first order diffraction can be rewritten as $-(CJ_1(\beta))^N \exp[i(\quad +N\omega_s)t]$. It can be found that the frequency part has an increment of $N\omega_s$.

In this way, in the circulating frequency shift process based on the ultrasonic grating, the light wave acquires a frequency shift amount of $N\omega_s$ after conducting circulating frequency shift N times. So long as the frequency shift amount doesn't cause the light frequency to arrive at the selected frequency of the tunable filter, the light wave would be fed back to the circulating frequency shift process without stopping until the frequency shift amount has caused the light frequency to arrive at the selected frequency of the filter.

Additionally, since the first diffractive angle, the wavelength of the light wave and the ultrasonic grating constant have a certain proportion relationship, i.e., $\sin \alpha = \lambda/\lambda_s$, the angle variation range has to be confirmed when the wavelength of the light wave varies after the circulating frequency shift. Assuming the ultrasonic grating constant is 34000 nm (velocity of sound is selected as 340 m/s, the frequency of the ultrasonic wave is 10 MHz), then, when the wavelength of the light wave fluctuates 20 nm from a fixed value (e.g. 1550 nm), the variation range of the angle is from 0.045 to 0.046 rad, i.e., from 2.58° to 2.65°. Obviously, when the wavelength of the light wave changes, the angle variation of the first order diffraction is not big, and that is of good help for the circulating frequency shift, real-time adjustment of the optical members is avoided, and it is convenient for optical integration.

Said first light circulator 37 is a 3-port circulator, wherein, a first port is connected to the output port of the second optical isolator 36, a second port is connected to the input port of the optical fiber Bragg grating 38, and a third port is connected to an absorbing load which absorbs the reflected light from the optical fiber Bragg grating 38. Said second light circulator 39 is a 3-port circulator, wherein, a first port thereof is connected to the output port of the optical fiber Bragg grating 38, a second port is connected to the input port of the tunable filter 310, and a third port serves as the light output port of the circulating frequency shift module 3.

The operating frequency bandwidth of respective members in the circulating frequency shift module 3 based on the ultrasonic grating frequency shift is not less than the frequency difference between the maximum output frequency at the output port 4 of the circulating frequency shift module and that of the laser 1 source. The operating wavelength bands of said first optical isolator 2 and respective members in the circulating frequency shift module 3 based on the ultrasonic grating frequency shift are consistent with that of the laser 1. The output power of the ultrasonic grating 32 and the lens $L_1$ 33 and the lens $L_2$ 34 can't exceed the maximum allowable input light power of the optical amplifier 35.

Said tunable filter 310 is a narrow-band filter which reflects a narrow-band light desired to be filtered to the third port 4 of the second light circulator 39 so as to output it, and transmits the light with other frequencies to the input port of the optical attenuator 311, the frequency variation of said frequency converter is equal to the difference between the frequency of the narrow-band output light of the tunable filter 310 and that of the output light of the laser 1, and the tunable frequency range of the frequency converter is not more than that of the narrow-band output light of the tunable filter 310.

Figure 2:
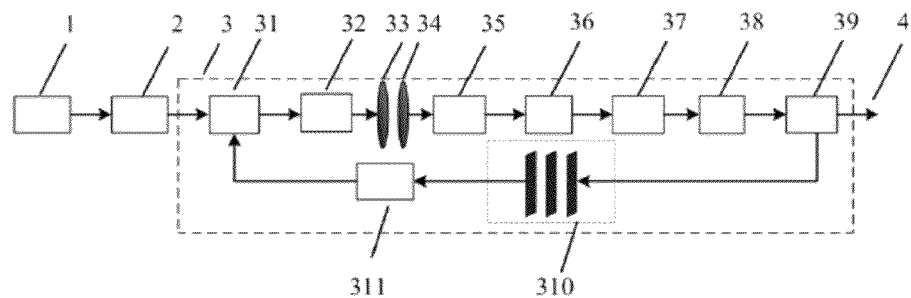
FIG. 2 is a schematic diagram of the first embodiment of the tunable optical frequency converter based on the ultrasonic grating in the present invention.
Figure 3:
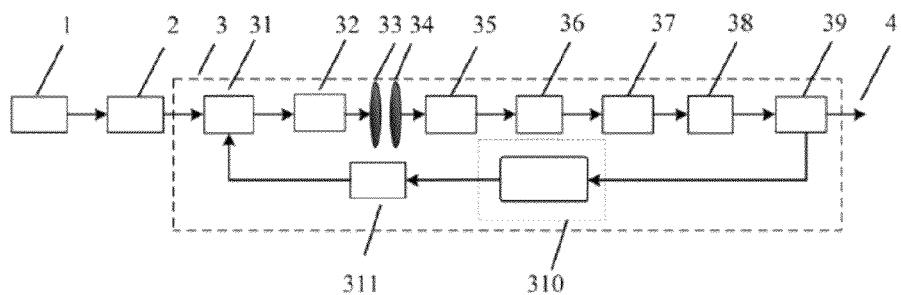
FIG. 3 is a schematic diagram of the second embodiment of the tunable optical frequency converter based on the ultrasonic grating in the present invention.

Preferably, the tunable filter 310 is a Bragg grating manufactured by the diffraction-grating technology (as shown in FIG. 2) or a tunable filter manufactured by one-dimensional defect-photonic-crystal technology (as shown in FIG. 3). The photonic bandgap of the one-dimensional photonic crystal is not less than the frequency tuning range of the final output light wave of the system, said one-dimensional photonic crystal includes a refractive index adjustable defect layer, the refractive index adjusting methods of which include electro-induced refractive index change, magneto-induced refractive index change, acoustic-induced refractive index change, photo-induced refractive index change, force-induced refractive index change or thermal-induced refractive index change. The one-dimensional photonic crystal has a defect mode which changes along with the change of the refractive index of the defect layer.

Respective component parts and the operating parameters thereof in one embodiment are described as follows. The laser 1 is selected to be a semiconductor CW laser with an ultra-narrow band width in 1550 nm, which has an operating wavelength of 1550 nm at 25, an output power of 5 mW, a continuous operating mode, a maximum band width of 50 kHz, and the output fiber type of which is SMF-28 single mode fiber (9/125 μm). The acousto-optic medium of the ultrasonic grating 32 is pure water, the operating frequency thereof is 10 MHz, the diffractive order can arrive at the third order, diffractive efficiency is 96%, the maximum ultrasonic frequency can arrive at 30 MHz, diffractive head volume is 4×4×2 $cm^3$. The selected lens $L_1$ 33 and lens $L_2$ 34 are a compression beam system which is antireflective near 1550 nm wavelength so as to be convenient for coupling the beam into the fiber. The tunable filter 310 is selected to have a tuning bandwidth up to 40 nm, for the central wavelength almost covering the entire C-band (1528 nm~1610 nm), the insertion loss of which is 4.0 dB, the volume of the filter is 24×8.8×35 $cm^3$. The optical amplifier 35 is selected to have an operating bandwidth of 40 nm, covering the entire C-band. The optical coupler 31 is selected to be the 50/50 optical element in response to the wavelength of 1550 nm. The first optical circulator 37 and the second optical circulator 39 are selected to have a responding wavelength around 1550 nm and a bandwidth of 40 nm, wherein, the first optical circulator 37 is an optical device connected to the absorbing load and provides an optical isolation effect, while the reflected light is absorbed by the absorbing load, then the device provides not only an optical isolation but also an environmental protection effects; while the second optical circulator 39 functions as both participating in the light circulation and light output. The fiber Bragg grating 38 is selected to provide a reflection inhibition effect for the carrier wavelength of 1550 nm. The optical coupler 31 optically couples the light outputted by source of the laser 1 together with the light circulated back as modulation signal light of the ultrasonic grating 32, and the ultrasonic grating 32 changes the frequency of the signal light by the optical-acoustic effect, so as to shift the frequency of the signal light. When the frequency of the signal light reaches the selected frequency of the tunable filter 310, the tunable filter reflects the light with the selected frequency back to the third output port 4 of the second optical circulator 39 and outputs it, otherwise the signal light will be transmitted with a high transmittance to the input port of the optical attenuator 311, and then enter the optical coupler 31 to be fed back to the ultrasonic grating 32 again to perform the frequency shift. This frequency shift process is continuously repeated, so that ultimately, the frequency shift of any magnitude is acquired, which is one of the key advantages of the scheme.

To ensure the components in the system not being damaged, the total power of the laser 1 and the light power circulated back should not exceed the maximum allowable optical power of the optical amplifier 35, and the output port of the tunable filter 310 is connected with the tunable attenuator 311.

Figure 4:
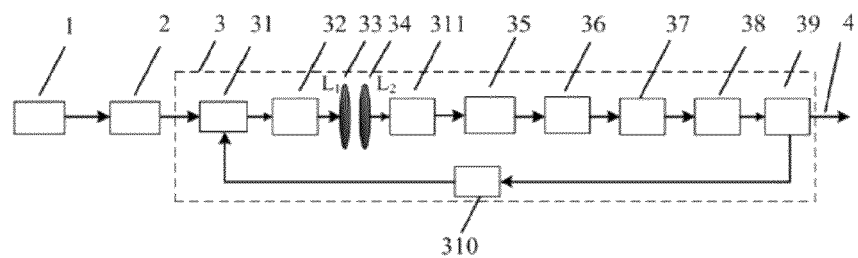
FIG. 4 is a schematic diagram of the third embodiment of the tunable optical frequency converter based on the ultrasonic grating in the present invention.

If the output light power of the ultrasonic grating 32 is high, a tunable attenuator must be arranged before the optical amplifier 35. In this case, the tunable attenuator 311 is arranged before the optical amplifier 35, so as to ensure the optical amplifier operates safely and correctly. FIG. 4 shows the embodiment.

Relative to the prior frequency converter, the present invention has the following outstanding advantages:

(1) Low Price.

Compared to the present expensive frequency converting technology described by the optical parametric oscillator method, optical frequency comb method, or mode-locked laser method, since neither the expensive laser source nor the precious nonlinear optical crystal is used in the present invention, so that the cost is greatly reduced.

(2) Compact, Portable.

The whole frequency converter based on the ultrasonic grating frequency shift is assembled by using the commercially available ordinary light sources and optical fiber components, and the final volume is estimated not to exceed 40×10×35 cm$^3$, weighing no more than 8 kg.

(3) Simple Light Path.

In the apparatus, as all the connections employ optical fibers, and none of the optical element is a movable optical element, the rest parts are easy to be fixed. The device is easy to be optically integrated.

(4) Big Tuning Range or Tuning Width.

Theoretically, the scheme can realize arbitrary frequency output, so long as the bandwidths of tunable filters, lens group, optical amplifiers, optical attenuators, optical circulators, optical couplers and transmission fibers are infinitely developed, our scheme will always apply. Even for the current optical components, such as tunable filters, optical amplifiers, and so on, with an operating bandwidth of only 40 nm, the frequency tuning width of 5 THz is acquired. In short, with the increase of the tuning bandwidths of all the optical components, such as the tunable filter, lens group, and the band-pass amplifier, the range of the frequency shift will increase proportionally.

(5) High Tuning Efficiency.

Tuning frequency of the scheme can be achieved in three ways:

on the one hand, the operating frequency of the ultrasonic grating is fixed and only the filter frequency of the tunable filter is changed, then the frequency changing ability is achieved; on the other hand, the filter frequency of the tunable filter may be fixed, while the operating frequency of the ultrasonic grating is continuously changed; the third way, both are regulated. Ultimate change of the frequency can be acquired by any kind of tuning, and the regulation efficiency thereof is very high.

(6) High Output Power.

Since the maximum gain of the circulating frequency shift module based on the ultrasonic grating can reach 1, so long as the output power of the initial laser source is set, after the circulating frequency shift is conducted, an output power which is absolutely equal to the initial setting of the laser source can be obtained, at the same time, the desired frequency is also obtained.

Although the present patent has described a number of specific examples, this patent without departing from the spirit of the claims specified, all changes to the person skilled in the art are evident.

What is claimed is:

1. A tunable optical frequency converter based on an ultrasonic grating, the converter comprising: a laser, a first optical isolator, a circulating frequency shift module based on the ultrasonic grating frequency shift; the circulating frequency shift module based on the ultrasonic grating frequency shift essentially consists of an optical coupler, an ultrasonic grating, $L_1$ lens, $L_2$ lens, an optical amplifier, a second optical isolator, a first optical circulator, a fiber Bragg grating, a second optical circulator, a tunable filter and a tunable attenuator; the second optical circulator is a 3-port circulator, wherein, a first port thereof is connected to the output port of the optical fiber Bragg grating, a second port is connected to the input port of the tunable filter, and a third port serves as the light output port of the circulating frequency shift module;

light output by the laser is input to the circulating frequency shift module to conduct frequency converting repeatedly after passing through the first optical isolator, separated by a tunable filter and a second optical circulator, and frequency shifted light is output from a port of the circulating frequency shift module.

2. The tunable optical frequency converter according to claim 1, wherein the laser is a semiconductor laser, a gas laser, a solid laser or a fiber laser with an operating wavelength in the 100 nm-100000 nm band.

3. The tunable optical frequency converter based on an ultrasonic grating according to claim 1, wherein a value of the closed-loop gain coefficient of the circulating frequency shift module is 1.

4. The tunable optical frequency converter according to claim 1, wherein the ultrasonic grating is a transmission-type ultrasonic grating and is used for phase modulation.

5. The tunable optical frequency converter according to claim 1, wherein the output power of the ultrasonic grating and the $L_1$ lens and the $L_2$ lens is equal or less than the maximum input light power of the optical amplifier.

6. The tunable optical frequency converter according to claim 1, wherein the first optical circulator is a 3-port circulator, wherein, a first port is connected to the output port of the second optical isolator, a second port is connected to the input port of the optical fiber Bragg grating, and a third port is connected to an absorbing load which absorbs the reflective light from the optical fiber Bragg grating.

7. The tunable optical frequency converter according to claim 1, wherein the operating frequency bandwidth of respective members in the circulating frequency shift module based on the ultrasonic grating frequency shift is not less than the frequency difference between the maximum output frequency at the output of the circulating frequency shift module and that of the laser.

8. The tunable optical frequency converter according to claim 1, wherein the operating wavelength bands of the first optical isolato and respective members in the circulating frequency shift module are consistent with that of the laser.

9. The tunable optical frequency converter according to claim 1, wherein the tunable filter is a narrow-band filter which reflects a narrow-band light desired to be filtered to the third port of the second circulator so as to output it, and transmits the light with other frequencies to the input port of the optical attenuator, the frequency variation of the frequency converter is equal to the difference between the frequency of the narrow-band output light of the tunable filter and that of the output light of the laser, and the tunable frequency range of the frequency converter is not more than that of the narrow-band output light of the tunable filter.

10. The tunable optical frequency converter according to claim 9, wherein the tunable filter is a frequency-tunable filter manufactured by one-dimensional defect-photonic-crystal technology or optical-diffraction-grating technology.

11. The tunable optical frequency converter according to claim 10, wherein the photonic bandgap of the one-dimensional photonic crystal is not less than the frequency tuning range of the final output light wave of the tunable optical frequency converter, the one-dimensional photonic crystal includes a refractive index adjustable defect layer, the refractive index adjusting method of which includes electro-induced refractive index change, magneto-induced refractive index change, acoustic-induced refractive index change, photo-induced refractive index change, force-induced refractive index change or thermal-induced refractive index change, the one-dimensional photonic crystal has a defect mode which changes along with the change of the refractive index of the defect layer.

12. The tunable optical frequency converter according to claim 1, wherein the closed-loop gain coefficient of the circulating frequency shift module is positive integer other than 1.

13. The tunable optical frequency converter according to claim 1, wherein the closed-loop gain coefficient of the circulating frequency shift module is the reciprocal value of the positive integer other than 1.

* * * * *